Patented Dec. 26, 1933

1,941,014

UNITED STATES PATENT OFFICE 1,941,014

HEAT TRANSMISSION AND DISTRIBUTION

Owen David Lucas, Bayswater, London, England, assignor to The Whessoe Foundry and Engineering Company, Limited, Darlington, England No Drawing. Application December 7, 1932, Serial No. 646,217, and in Great Britain December 9, 1931

3 Claims. (Cl. 252—5)

This invention relates to heat transmission and distribution, especially for industrial purposes, including the cracking of oils, to methods of and means for the utilization of diphenyl or diphenyl oxide, and to the employment of diphenyl or diphenyl oxide in compositions as heating media.

In the specifications of British Letters Patent Nos. 336,269 and 360,816 there are described matters relating to heat transmission and distribution by means of diphenyl and diphenyl oxide in the liquid phase.

The primary object of the present invention is to provide improvements in and relating to such methods of heat transmission and distribution.

As a result of researches, it has now been found that diphenyl and diphenyl oxide can be so modified as to reduce the freezing point, and further that the so modified substances can be employed for heat transmission and distribution purposes, as indicated above. The thus modified diphenyl or diphenyl oxide, whether the product be in the form of a mixture or a compound, for example, a eutectic alloy or solution or mixture, is believed to be new, apart from its application.

The additions to the diphenyl or diphenyl oxide are principally made with the following ends in view:—

(1) The freezing point should preferably be depressed below 10° C.

(2) The boiling point should preferably remain above 200° C.

(3) Mixture should preferably not undergo material decomposition at temperatures below 400° C. when heated for prolonged periods. As subsidiary points, the additions should be preferably non-toxic in character, miscible in the liquid phase, with the basic materials, and chemically inert in respect of the industrial metals with which they are likely to come into contact.

The invention consists in methods of heat transmission and distribution, by the application of diphenyl or diphenyl oxide or ether, maintained in the liquid phase under conditions avoiding solidification, and free from contact with other fluids during working, in which difficulties from solidification are prevented or reduced by additions to the diphenyl or diphenyl oxide, yielding a liquid of reduced or minimum freezing point, for instance, additions of benzene derivatives with oxygen or ammonia groups attached, or with hydroxy groups, specific reference being made to additions of aniline and naphthalene, and of diphenylamine and naphthalene, for instance diphenyl oxide 60 per cent., diphenylamine 30 per cent. and naphthalene 10 per cent.

The invention also consists in heat transmission and distribution systems or apparatus, according to either of the specifications of British Letters Patent Nos. 336,269 or 360,816, using diphenyl or diphenyl oxide modified according to the preceding paragraph.

Example 1

In carrying the invention into effect in one form by way of example, the following modified diphenyl oxide composition is employed, reference to percentages being to percentages by weight:—

| | |
|---|---|
| Diphenyl oxide | 70 per cent. |
| Aniline | 20 per cent. |
| Naphthalene | 10 per cent. |

This mixture is a liquid at ordinary temperatures, and has a boiling point of about 212° C. and a freezing point of under 6° C. It is prepared from a liquid, namely aniline, and two solids, namely, diphenyl oxide and naphthalene.

A suitable method of preparation is as follows:—

The diphenyl oxide is first melted and the aniline added and mixed. The naphthalene is then added in the solid form and the mixture kept warm until the whole of the naphthalene has dissolved.

Example 2

In carrying the invention into effect according to a modification, the following mixture is used:—

| | |
|---|---|
| Diphenyl oxide | 60 per cent. |
| Diphenylamine | 30 per cent. |
| Naphthalene | 10 per cent. |

The product is a liquid which has a boiling point of about 246° C. and a freezing point of about 4° C. All the ingredients are solids at ordinary temperatures with relatively high boiling points; diphenyl oxide boiling at 256° C., diphenylamine at 310° C., and naphthalene at 280° C.

A convenient method of preparing the product is as follows:—

The diphenyl oxide and diphenylamine are first melted separately, then mixed, and the naphthalene added in the solid form and the liquid kept warm until it has completely dissolved.

Example 3

In carrying the invention into effect according to a further modification, it has been found that if diphenyl oxide be heated under pressure in the liquid phase at a temperature above 510° C., decomposition starts and increases progressively with the time and the temperature above this point. The products of decomposition appear to be phenolic or quinolic bodies, together with benzene. If this benzene be distilled off with any other low boiling-point liquids up to say 250° C., the residue boiling at about 250° C. will be stable up to 400° C., and its freezing point will be very much depressed to the order of minus 38° C. This result appears to be due to the presence of phenolic or quinolic bodies produced by the spontaneous decomposition described above, and their proportions to give this result are about 20 per cent. to 30 per cent., remainder being undecomposed diphenyl oxide.

General

The invention is not limited to the above examples, and as a guide to the variations which are possible, the following table is given, dealing with mixtures of diphenyl oxide, diphenylamine and naphthalene, with reference to both freezing and boiling points:—

| Diphenyl oxide | Diphenyl-amine | Naphthalene | Freezing point | Boiling point |
|---|---|---|---|---|
| 60% | 35% | 5% | 6° | 244° |
| 60% | 30% | 10% | 4° | 246° |
| 60% | 25% | 15% | 6° | 247° |
| 60% | 20% | 20% | 12° | 246° |
| 60% | 10% | 30% | 26° | 244° |
| 70% | 20% | 10% | 9.5° | 249° |
| 70% | 15% | 15% | 12° | 242° |
| 70% | 10% | 20% | 15° | 240° |

Having now described my invention, what I claim as new and desire to secure by Letters Patent is:—

1. A composition of matter comprising diphenyl oxide about 70% by weight, naphthalene about 10% by weight and aniline about 20% by weight.

2. A composition of matter comprising diphenyl oxide about 60% by weight, naphthalene about 10% by weight and diphenyl amine about 30% by weight.

3. A heat transmission medium, comprising about 60% to 70% by weight of diphenyl-oxide together with about 10% by weight of naphthalene and a substance selected from a group consisting of diphenyl-amine and aniline in proportions giving a composition of initial freezing point not hgher than about 6° C.

OWEN DAVID LUCAS.